(12) United States Patent
Massen

(10) Patent No.: US 8,599,196 B2
(45) Date of Patent: Dec. 3, 2013

(54) SYSTEM AND METHOD FOR GENERATING COMPUTER RENDERED CLOTH

(76) Inventor: Michael Massen, New York, NY (US)

(*) Notice: Subject to any disclaimer, the term of this patent is extended or adjusted under 35 U.S.C. 154(b) by 399 days.

(21) Appl. No.: 12/803,120

(22) Filed: Jun. 18, 2010

(65) Prior Publication Data

US 2011/0310086 A1  Dec. 22, 2011

(51) Int. Cl.
*G06T 15/00* (2011.01)

(52) U.S. Cl.
USPC .......................................... 345/419; 345/423

(58) Field of Classification Search
None
See application file for complete search history.

(56) References Cited

U.S. PATENT DOCUMENTS

| | | | |
|---|---|---|---|
| 6,226,006 B1 * | 5/2001 | Collodi | 345/426 |
| 6,246,414 B1 * | 6/2001 | Kawasaki | 345/419 |
| 7,663,648 B1 | 2/2010 | Saldanha et al. | |
| 2002/0130890 A1 * | 9/2002 | Karatassos et al. | 345/634 |
| 2005/0256686 A1 | 11/2005 | Stabelfeldt et al. | |
| 2008/0158239 A1 | 7/2008 | Lamy et al. | |
| 2009/0099683 A1 * | 4/2009 | Lastra et al. | 700/132 |
| 2009/0146995 A1 * | 6/2009 | Van Bael et al. | 345/419 |
| 2010/0306082 A1 * | 12/2010 | Wolper et al. | 705/27 |
| 2011/0022372 A1 * | 1/2011 | Isogai et al. | 703/11 |

FOREIGN PATENT DOCUMENTS

WO    WO 2009/119146    * 10/2009

OTHER PUBLICATIONS

Bridgman, George B.; Bridgman's Complete Guide to Drawing from Life; 1952; pp. 324-332, Sterling Publishing Co., United States.
Hamm, Jack; Drawing the Head and Figure; 1963, 109-111, 117-119; The Berkeley Publishing Group, New York.
Hogarth, Burne; Dynamic Wrinkles and Drapery; 1995; pp. 38-39, 50-51; Watson-Guptill Publications, New York.
Lanteri, Edouard; Modelling and Sculpting the Human Figure; 1902, pp. 22-25, 36-37, 41-45; Dover Publications, Inc., Mineola, NY.
Young, Cliff; Drawing Drapery from Head to Toe; 1905, pp. 6-12, 19-21; Dover Publications, Inc., Mineola, New York.
Lander, Jeff; Devil in the Blue Faceted Dress: Real Time Cloth Animation; Mar. 27, 2000; Gamasutra; www.gamasutra.com/view/feature/3444/devil_in_the_blue_faceted_dress_.php.
Havok; Havok Cloth Tears Up 2009 Game Developers Conference/Havok Cloth; http://www.havok.com/index.php?mact=News,cntnt01,detail,0&cntnt01articleid=52.
Autodesk; nCloth Advanced Techniques; 2009; http://usa.autodesk.com/adsk/servlet/index?siteID=123112&id=13710022&linkID=9242256.

* cited by examiner

*Primary Examiner* — Daniel Hajnik
*Assistant Examiner* — Andrew G Yang
(74) *Attorney, Agent, or Firm* — Ward & Zinna, LLC

(57) ABSTRACT

A system, method and computer software program on a computer readable medium for loading cloth modeling data, generating an environmental model, generating a basic cloth model, and generating sections of a cloth surface model based on the basic cloth model and the cloth modeling data. The sections of the cloth surface model may be partial geometric forms, a portion of a ball and stick model or a non-uniform rational basis spline, and may be joined together and smoothed to form a complex cloth model. The smoothed cloth model may include a series of waves or folds in a computer rendered cloth surface to represent draped or compressed cloth on a three dimensional surface.

16 Claims, 16 Drawing Sheets

SYSTEM AND METHOD FOR GENERATING COMPUTER RENDERED CLOTH

FIELD OF THE INVENTION

The present principles generally relate to computer graphics. More specifically, the present principles refer to a system and method for rendering hanging and draped cloth on a computer system.

BACKGROUND OF THE INVENTION

Computer generated imagery is frequently used to generate lifelike representations of characters, people, objects and scenes encountered in everyday life. However, computer generated imagery uses a vast amount of processing power, and rendering lifelike scenes is difficult using even modern techniques.

Computer generated images are frequently generated using one of several methods. Ray tracing is used to generate highly realistic images, at a very high computational cost. In ray tracing, a camera is inferred to be at the point where a viewer would theoretically view the image. A ray is projected from the camera and through each pixel of a theoretical computer screen onto which the image will be displayed. The ray is further projected through this screen and into the landscape or scene to be rendered. The objects in a scene are represented in a three dimensional mathematical form in computer memory. The path of the ray from the camera through the target pixel on the screen is calculated and the portion of the scene the ray strikes is determined. The characteristics, such as color, texture and lighting of the portion of the scene struck by the ray is determined and used to render the target pixel in a computer generated graphic frame. The same procedure is repeated for each pixel in an image, and then multiple sequential images may be generated to form a movie or motion picture. Because each image requires that each pixel be calculated separately, generating ray-traced moving images in real-time is impractical and the technique is generally used for recorded movies where multiple frames can be rendered at the same time on different computers and assembled in order at the end of the rendering process.

Polygonal mesh modeling is a technique commonly used to generated real-time three dimensional models which are then projected onto a two dimensional screen. Optimal mathematical models are broken down into a model comprising a faceted set of polygons. Generally, the number of polygons comprising any particular model is determined by the desired level of detail of a computer generated image. High polygon counts in an image require greater computational power because the placement and characteristics of more polygons requires more time to render. The advantage of polygonal mesh modeling is that the number of polygons rendered for a scene may be changed to reflect a higher or lower image quality as required.

Both of these common techniques are generally used to render scenes that have models already generated. However, neither of these techniques takes into account the unique challenges involved in rendering draped cloth. To date, most real-time rendering of cloth has been avoided, primarily by clothing characters (particularly in video games) in simple clothing or in rigid or tight fitting clothing. This avoids having to render cloth that undulates, or that is draped or folded.

What is needed is a model that can be used to describe folded, draped or hanging cloth. The presented principles embody a system and method for rendering such loose cloth by a computer system.

SUMMARY OF THE INVENTION

Presented herein is a system and method for generating a model embodying cloth for display on a computer system adapted to display graphics. In one embodiment of the presented principles, a method for generating and modeling cloth on a computer, or a computer program embedded on a computer readable medium, may include the steps of loading cloth modeling data, creating an environmental model, creating a basic cloth model based on the environmental model, creating a plurality of cloth sections by applying loaded cloth modeling data to the basic cloth model, joining and smoothing the cloth sections to form a smoothed target cloth model, and then error checking the smoothed target cloth model against the desired properties of the cloth being rendered. The presented principles may optionally further comprise the steps of creating a wave interference matrix to model one or more folds in a cloth model or using a ball and stick model to generate a cloth model. Alternatively, the presented principles may also comprise the step of using one or more draped loops, partial cylinders, partial spheres or any combination of the same to generate a cloth model.

In an alternative embodiment of the presented principles, a system for generating an image on a computer system may be comprised of a data loader module for loading cloth modeling data, an environment modeling module for creating an environmental model, a cloth crease modeler module for generating an interference matrix having a plurality of cloth folds and creating and joining a plurality model cloth sections, a smoother module for smoothing the joints between the joined cloth model sections and error checking the smoothed cloth model and a renderer module for generating a displayable image from the smoothed cloth model. The presented principles may further comprise using non-uniform rational basis splines to represent a cloth surface and the curves of folds in the cloth.

BRIEF DESCRIPTION OF THE DRAWINGS

A further understanding of the present principles can be obtained by reference to a preferred embodiment, along with alternative embodiments, set forth in the accompanying drawings where like reference numbers indicate like elements throughout the drawings. Although the illustrated embodiments are merely exemplary of systems for carrying out the present principles, the organization and method of operation of the principles in general, together with further objectives and advantages thereof, may be more easily understood by reference to the drawings and the following description. The drawings are not intended to limit the scope of the principles, which is set forth with particularity in the claims as appended or as subsequently amended, but merely to clarify and exemplify the principles.

For a more complete understanding of the present principles, reference is now made to the following figures.

DETAILED DESCRIPTION

Figure 1A:
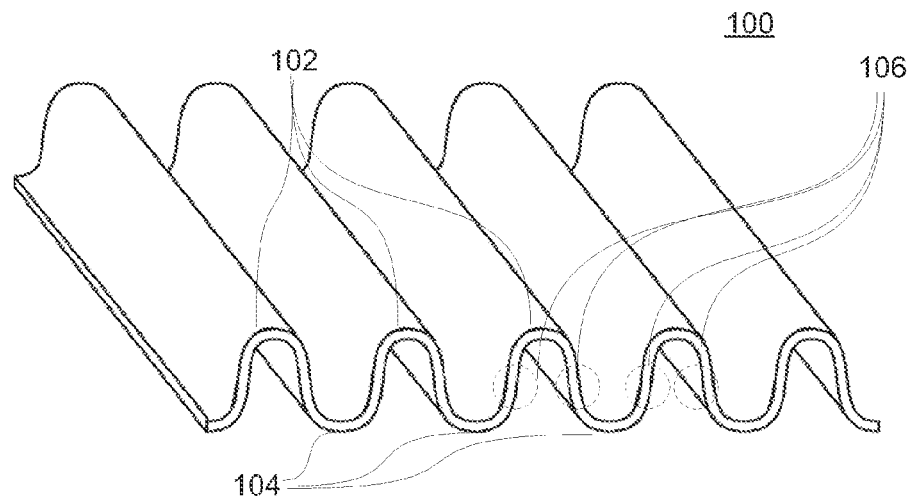
FIGS. 1a and 1b are diagrams illustrating horizontal and vertical planar waves in cloth.

Illustrative embodiments of the present principles are disclosed herein. However, techniques, systems and operating structures in accordance with the present principles may be embodied in a wide variety of forms and modes, some of which may be different from those in the disclosed embodiment. Consequently, the specific functional details disclosed herein are merely representative, yet in that regard, they are deemed to afford the best embodiment for purposes of disclosure and to provide a basis for the claims herein which define the scope of the present principles.

Some elements of the present principles are illustrated as modules for performing described functions. While these modules may be described in terms of software implementations, any hardware, or combination of hardware and software may be used to implement the present principles without deviating from the scope or spirit thereof.

Moreover, well known methods and procedures for both carrying out the objectives of the present principles and illustrating the preferred embodiment are incorporated herein but have not been described in detail as not to unnecessarily obscure novel aspects of the present principles.

The presented principles are described in terms of a system and method for rendering cloth in various situations using a computer system. It will be obvious to one skilled in the art that the systems and modules described herein may be implemented solely in software, solely in hardware, or as a combination of both. Skilled practitioners of the computer graphics arts will recognize that on computer systems used to display graphics on the fly, a computer's graphic card may be used to perform rendering of a cloth model. It is well known in the field that the heavy mathematical calculations used to generate computer imagery on a display may be offloaded to a graphics processing unit. Most recently, graphics processing units have been included on graphics cards, allowing the model of a scene to be loaded onto the graphics card. Most modern graphics cards include engines that can take a polygonal mesh model for a scene and perform the calculations necessary to project the three dimensional polygonal mesh model onto a two dimensional virtual plane, apply the necessary texturing, lighting and shading and present the rendered image to a user. Graphics application programming interfaces (APIs), such as Microsoft's DirectX™ or OpenGL® allow programmers to provide the APIs with models for rendering. The APIs may render the frame themselves, or may send the model to capable video cards for rendering. Thus, models may be rendered in software, hardware, or a combination of both.

Furthermore, game engines permit programmers to script the motion of models and control the interaction of graphic models prior to rendering. The present principles are intended to be used in a wide range of applications. In particularly useful embodiments, the presented principles may be implemented in as software module, and included in graphics rendering APIs, graphics design programs, or game engines or any other useful software. In such an implementation, the software module may be any known or as yet undiscovered portion of computer code. The software module, may for instance, be, but is not limited to, a dynamically linked library, a component object model (COM) object, software procedure, a library or include file, an inline section of code or may be integrated in any other code. Furthermore, the presented principles may be implemented in a single software module, or as any number of software modules. In particularly useful embodiments, multiple software modules may be distributed through a computer system such at different modules may take advantage of multiple processors or processor cores, or may use one or more graphics processing units at the same time as a main CPU.

Alternatively, other useful embodiments of the presented principles may be where a graphics card or graphics rendering processor, whether shared or dedicated, include rendering hardware that may model the cloth according to the presented principles.

Similarly, a system using a combination of software and hardware to render cloth according to the present principles may be advantageously employed. For example, in one embodiment, a software module being executed by one or more processor cores on a main CPU may calculate the model created for a particular cloth panel given the parameters of the cloth and its positioning, after which a hardware module on a graphics processing unit may render the model and apply a particular cloth texture, cloth pattern and atmospheric lighting and shading.

Figure 1B:
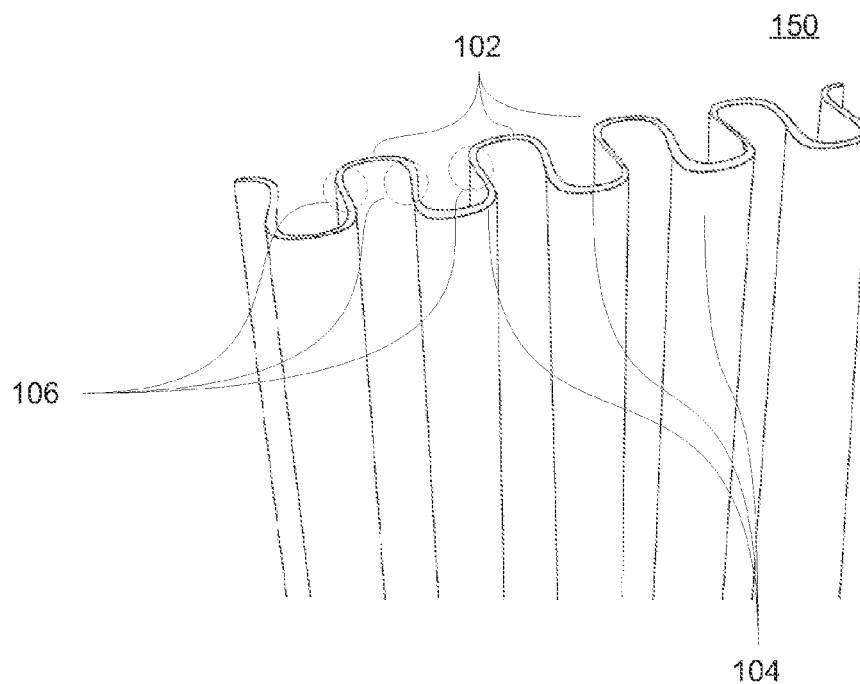

Referring now to FIG. 1a, a diagram 100 illustrating horizontal planar waves in cloth is shown. FIG. 1b illustrates vertical planar waves 150 in cloth. Notably, the waves form parallel to tension applied to the cloth. When cloth is under compression, waves in the cloth tend to form perpendicularly to the compressive force. When cloth is compressed, it tends to form waves that appear somewhat sinusoidal. However, the waves in cloth are not perfectly sinusoidal. Instead, the waves in cloth may be more accurately approximated by using partial hollow cylinders. In one embodiment, taking a cylinder and removing one lengthwise section allows an approximation of one section of a cloth wave 102 and 104. Combining multiple cloth wave sections 102 and 104 in alternating orientations, and joining the sections at the open edges 106 allows a reasonable approximation of a planar wave in cloth 100. In particularly useful embodiments, the joint 106 of two opposing partial cylinders will be a smooth transition. For instance, the partial cylinders will have a section removed such that the tangent of the curve of the cylinder wall at the opening for the upper cylinder 102 coincides with the tangent of the curve for the opening at the lower cylinder 104.

While one embodiment of the presented principles are described as a series of geometric shapes, the modeling of the desired shapes can be accomplished with any known or as yet undiscovered modeling technique, such as, but not limited to non-uniform rational basis splines (NURBS), polygon or triangle meshes, point clouds, Bezier surfaces, and the like. As the actual modeling format is used to describe the shapes and surfaces taught by the present principles, skilled practitioners will recognize that the various modeling formats described herein have their respective advantages, and that different modeling situations may call for different modeling formats.

While the partial open cylinder may be derived from an extruded circle, it may also be derived by extruding an ellipse, oval or other usable polygon. In one useful embodiment, the cross section of the partial cylinder 102 and 104 may be determined from the physical properties of the cloth being modeled. Furthermore, skilled practitioners will recognize that the embodiments described herein to model planar waves using cylinders may also be extended to modeling non-uniform and non-planar waves using conic sections.

It is well known that different cloths tend to exhibit different physical characteristics.

Denim, for example, is generally stiff when bent, and exhibits little or no stretch when under tension. Thus, stiff denim tends to form large waves under compression and smaller waves under tension. Synthetic fibers, such as lycra, tend to be very supple, folding easily, and stretching when under tension. Therefore, when modeling lycra, partial cylinders of a smaller diameter may be used to model the cloth. Conversely, for denim, partial cylinders with a larger diameter may be used to model the cloth.

In particularly useful embodiments, the cloth rendering software may be configured to receive or load a set of data related to the physical properties of the cloth to be rendered and to render the cloth using one or more partial cylinders having a size or shape reflecting those physical properties.

Figure 2A:
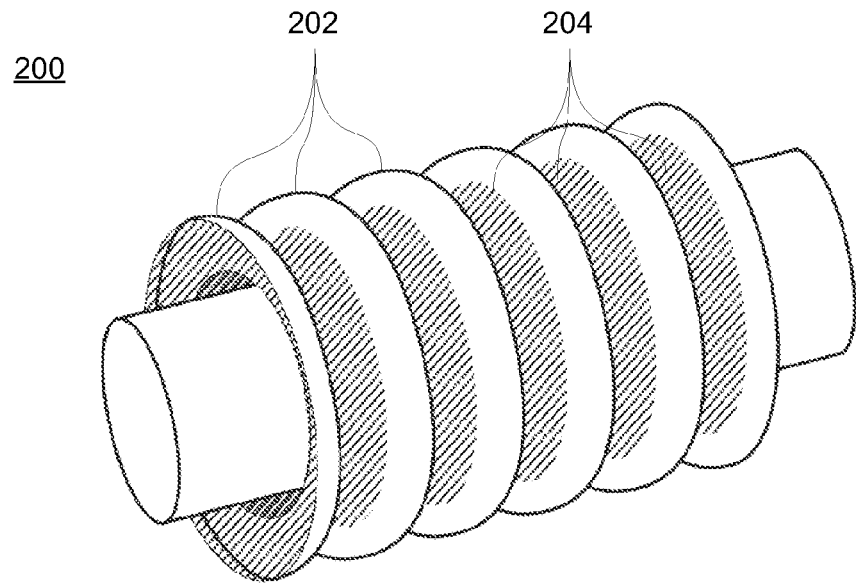
FIGS. 2a and 2b are diagrams illustrating waves in cloth applied perpendicularly and parallel to a cylinder.

FIG. 2a illustrates a cloth wave applied to a perpendicularly to the axis of a cylinder. In one embodiment of the present principles, the cloth waves may be formed by one or more tori 202 and 204 or loops with sections removed from the inner or outer circumferences. Skilled practitioners of the geometric arts will recognize that this is analogous to the planar waves 100 and 150 described in FIGS. 1a and 1b, with the difference being that the planar wave is bent around a cylinder and the open ends of the partial cylinders joined to form a loop or torus 202 and 204.

Figure 2B:
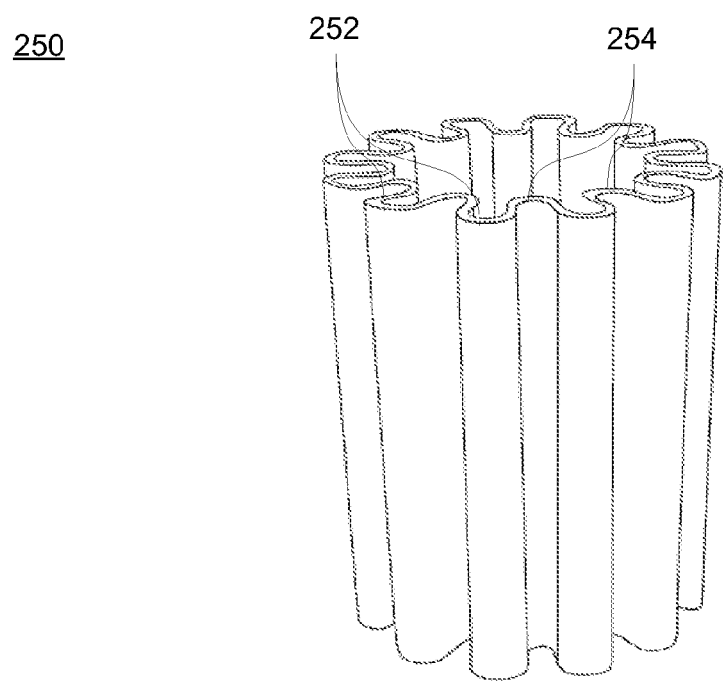

FIG. 2b illustrates a cloth wave applied parallel to the axis of a cylinder 250. In one embodiment, the alternating partial open cylinder technique discussed with respect to FIGS. 1a and 1b may be advantageously applied. However, the curved topology of the cylinder may warrant, in certain embodiments, using different sized partial cylinders for the inner facing partial cylinders 252 and outer facing partial cylinders 254 in order to create a curved surface.

Figure 3:
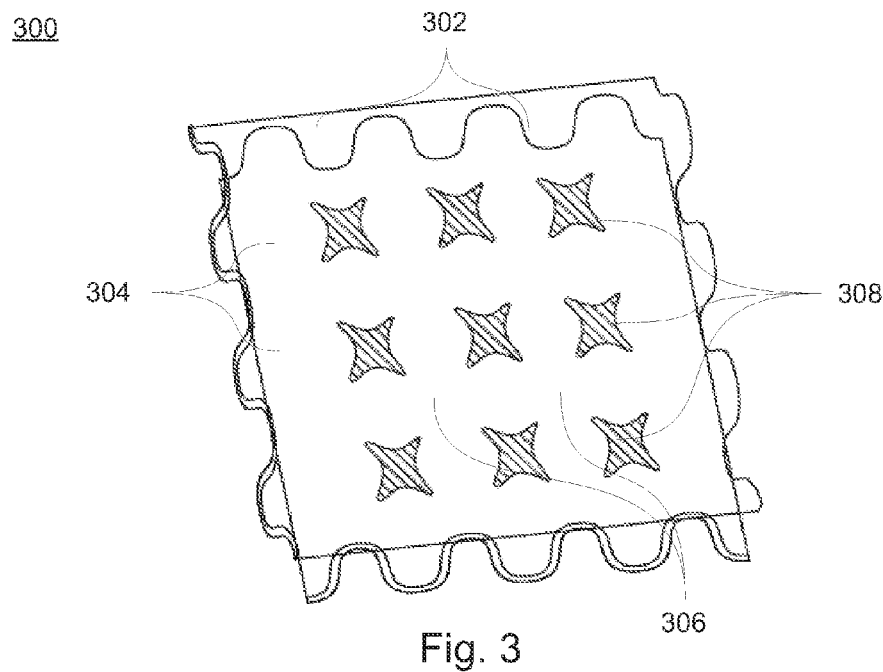
FIG. 3 is a diagram illustrating the interference of planar waves in a single cloth surface.

FIG. 3 illustrates the interference pattern 300 created by planar waves on a single surface. In this Fig., two sets of cloth waves intersect each other at right angles to create an interference pattern 300. A vertically aligned planar wave 302 intersects the horizontally aligned planar wave 304 to create a wave interference pattern 300. While the interference pattern 300 shown in FIG. 3 illustrates two wave patterns intersecting at a right angle, skilled practitioners will recognize that this angle can be varied to virtually any angle.

A cloth surface with intersecting waves tends to have both high points or nodes 306 and low points, or anti-nodes 308. Traditional wave interference patterns, in fluids or light, for example, tend to be additive in nature. That is, the height or amplitude of points where the peaks of waves intersect is a function of the sum of the height of the peaks of the interfering waves. However, with cloth, the heights of the peak intersections 306 tend to be wider, and not necessarily taller than the peaks of the individual waves. This is due to the nature of cloth, where the length of the cloth across any particular dimension tends to be constant. However, skilled practitioners will recognize that the physical properties, such as the "stretchiness," of the cloth may cause the dimensions of the cloth to vary, particularly when it is under tension.

Figure 4:
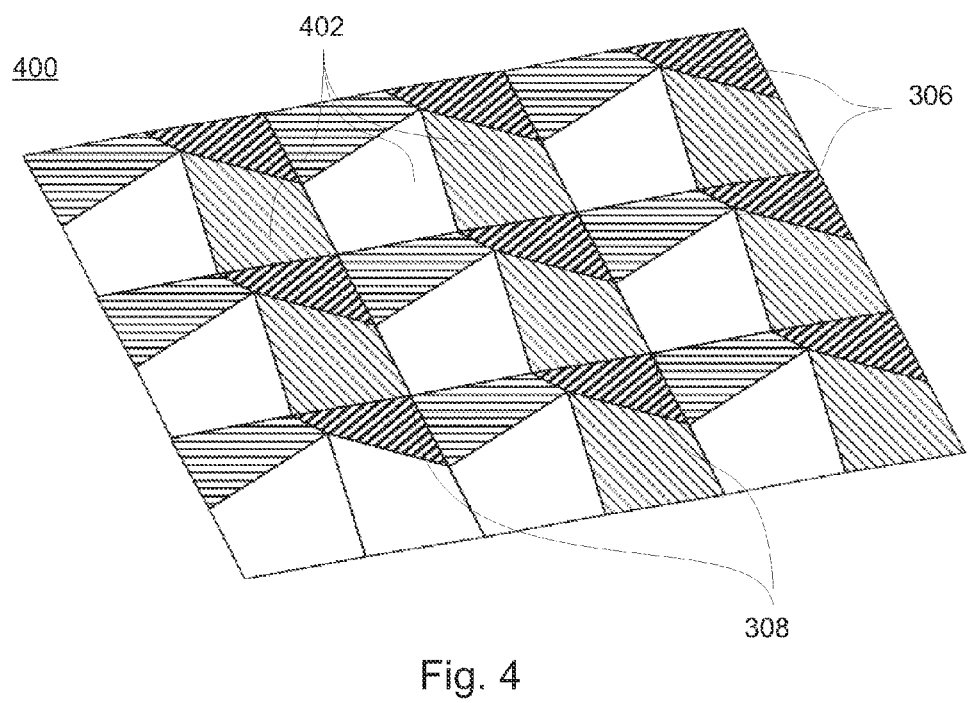
FIG. 4 is a diagram illustrating a generalized representation of a wave interference matrix.

Referring now to FIG. 4, a generalized representation of a wave interference matrix 400 is depicted. Nodes 306 and anti-nodes 308 define planes that approximate an undulating cloth surface. In this embodiment, the wave interference matrix 400 uses triangular polygons 402 to very roughly approximate the appearance of cloth having intersecting waves. Skilled practitioners of the art will recognize that closer approximations of smooth cloth surfaces may be achieved by subdividing the polygons 402 into smaller polygons and adjusting their angles and sizes to more smoothly approximate the cloth. This embodiment may be particularly useful when rendering cloth using a polygonal mesh as the wave interference matrix may be directly rendered as a polygonal mesh.

Figure 5A:
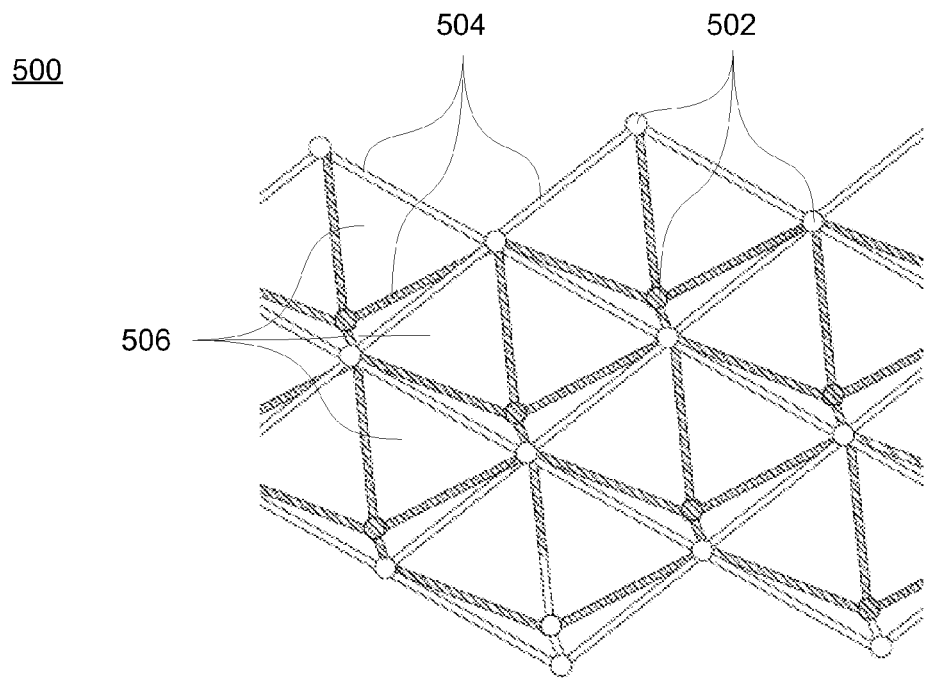
FIGS. 5a and 5b are diagrams illustrating embodiments of a cloth rendering matrix.

FIG. 5a illustrates one embodiment of a cloth rendering matrix 500 (hereinafter, "matrix"). In this embodiment, the matrix 500 is represented by a ball-and-stick model. The intersections of the peaks or troughs of interfering waves are represented by the balls 502, while the non-intersecting peaks and troughs of each of the planar waves are represented by a stick 504 connecting the balls 502, or peak intersections and valley intersections. In particularly useful embodiments, the matrix 500 may be advantageously stored as a matrix of coordinates, with the locations of the balls 502 stored in the matrix and vectors to nearby balls 502 representing the sticks 504. The balls 502 and sticks 504 represent the surface folds of the rendered cloth. The interstitial panels 506 represent the generally flat cloth panels between creases in the cloth surface. The technique is similar to that used in polygon mesh modeling, where the coordinates of the corners of polygons are stored along with a vector to another polygon corner.

However, in order to render cloth in a realistic manner, the present principles may be advantageously applied to polygonal mesh modeling. To avoid the sharp edges associated with regular polygon modeling of cloth, the matrix may be used to determine the location of the balls 502 and sticks 504, then during rendering the balls and sticks may be rendered, for example, by using partial spheres for the balls 502 and partial cylinders for the sticks 504. This advantageously permits the rendering of an undulating cloth surface with smoothed folds and corners. Additionally, the panels 506 bounded by the balls 502 and sticks 504 may be rendered as flat polygons, simplifying the overall rendering process. In order to render the cloth smoothly and without sharp edges or creases, the balls 502 and sticks 504 may be cut from whole hollow spheres or hollow cylinders such that the edges of the spheres and cylinders align with each other and the panels 506 to form a smooth surface. Skilled practitioners of the arts will recognize that edge matching by taking the tangent of the sphere or cylinder at edge of the surface will allow the system to determine whether the sphere or cylinder edges line up with each other and with the panels 506. Alternatively, the system may smooth out the joints between balls 502 sticks 504 and panels 506 by applying a graphical fillet to the joins. For example, the system may apply a Bezier curve, mesh, spline, or edge smoothing to the joins. Additionally, any combination of edge matching and smoothing may be used. For example, edge matching may be used to align panels 506 to sticks 504 and the sticks 504 to balls 502, but a smoothing may be necessary where a panel 506, stick 504 and ball 502 all join together. Furthermore, the smoothing and edge matching may be accomplished by subdividing any of the components (balls 502, sticks 504 or panels 506) and adjusting the position and alignment of any subdivisions to smooth any joints.

In one useful embodiment, a coordinate matrix may simply store the locations of the balls 502 and information on the ball's connection to adjoining balls. In such an embodiment, the cloth matrix may be rendered using default properties for the balls 502 and sticks 504, so that each ball 502 or stick 504 has the same thickness or size. In an alternative embodiment, the location for each ball 502 and a vector, or stick 504, is saved in the coordinate matrix, along with physical properties related to the individual ball 502 or stick 504. In such an embodiment, the physical properties may be used to directly determine the size and curvature of the balls 502, sticks 504, panels 506 and joins, or the physical properties may be used as a basis for calculations to determine the same. For example, in a motion picture rendering of dynamic or moving cloth, physical properties maybe applied to the components of the cloth rendering, but may be modified for each frame of rendering based on the movement of physical interactions of the cloth. Additionally, the physical properties may be any physical property related to the cloth being rendered, the environment, or other objects in the scene. For example, the physical properties used to model cloth may include environment gravity, cloth density, cloth thickness, cloth stiffness, cloth stretchiness, adherence to objects, atmospheric density (such as for wind or water affecting or blowing the cloth) or the like. Skilled practitioners will recognize that the physical properties are not limited to those listed herein, but may be any property affecting the cloth.

Figure 5B:
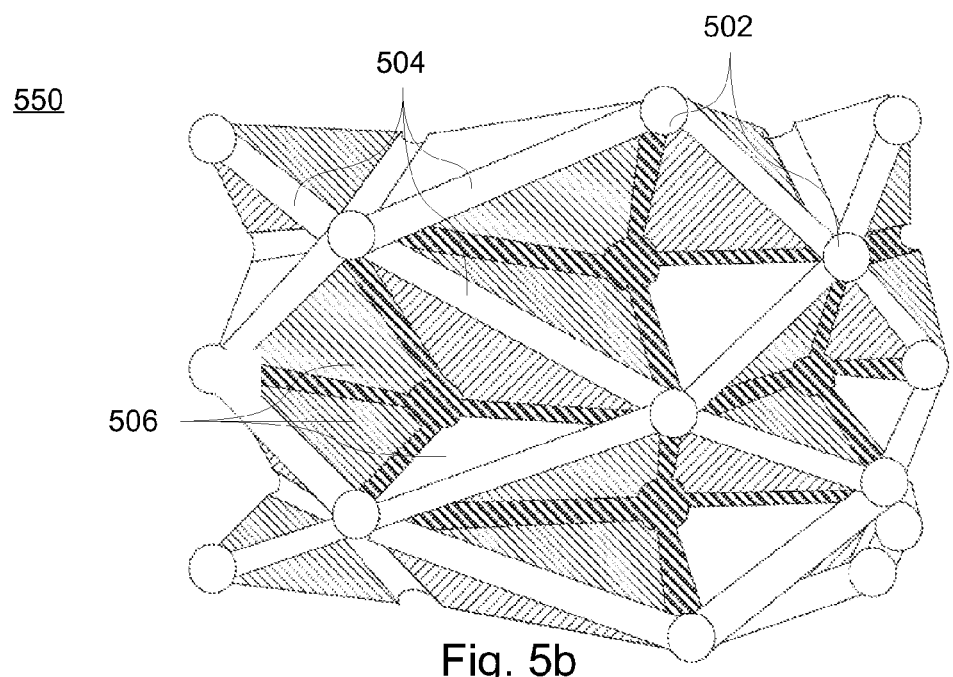

FIG. 5b illustrates the ball 502 and stick 504 model of a cloth rendering matrix 500 as applied to a curved surface 550. Here, it can be seen that the shape of the panels 506 may vary, as can the lengths of the sticks 504.

Figure 6A:
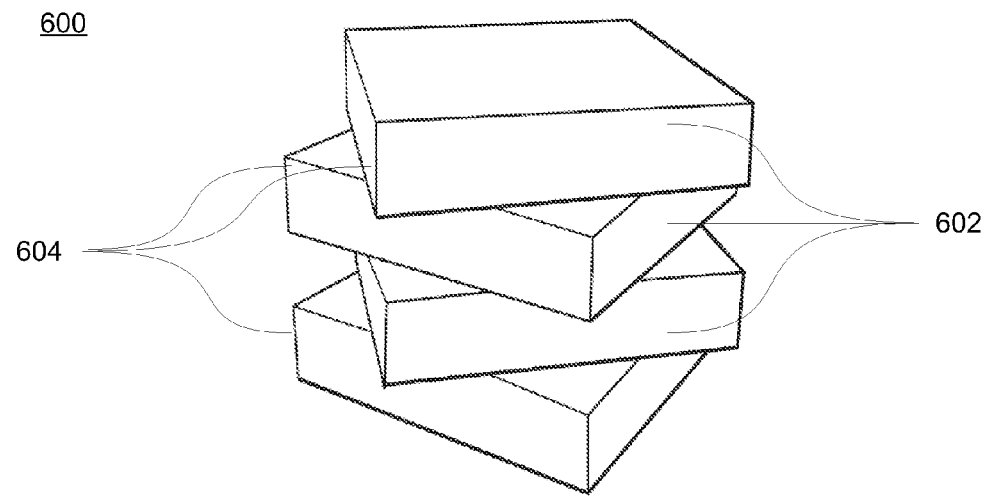
FIGS. 6a and 6b are diagrams illustrating an embodiment of representing a cloth rendering matrix on a cylinder.
Figure 6B:
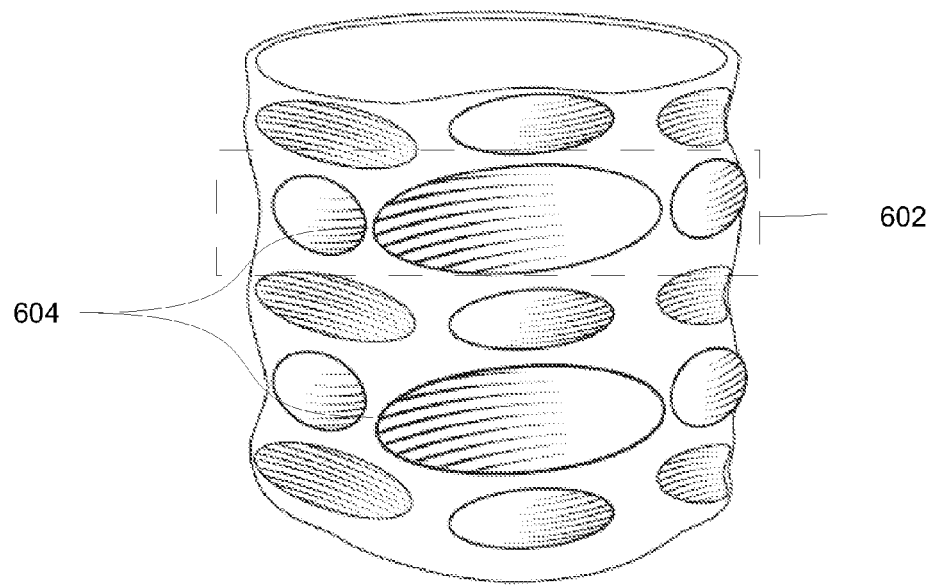

FIGS. 6a and 6b illustrate an embodiment of representing a cloth rendering matrix on a cylinder. FIG. 6a shows a generalized structure for modeling cloth on a cylinder 600. An arrangement of square blocks is shown, but any extruded polygon may be used. The corner edges 602 of the individual blocks maybe used to determine or model the peaks or nodes of a matrix, while the flat sides of the blocks 604 model the valleys, or anti-nodes in the matrix.

When the matrix is more fully modeled on a cylinder as shown in FIG. 6b, placing balls at the corners of the block 602 and connecting them via sticks permits rapid and accurate modeling of the matrix.

Figure 7:
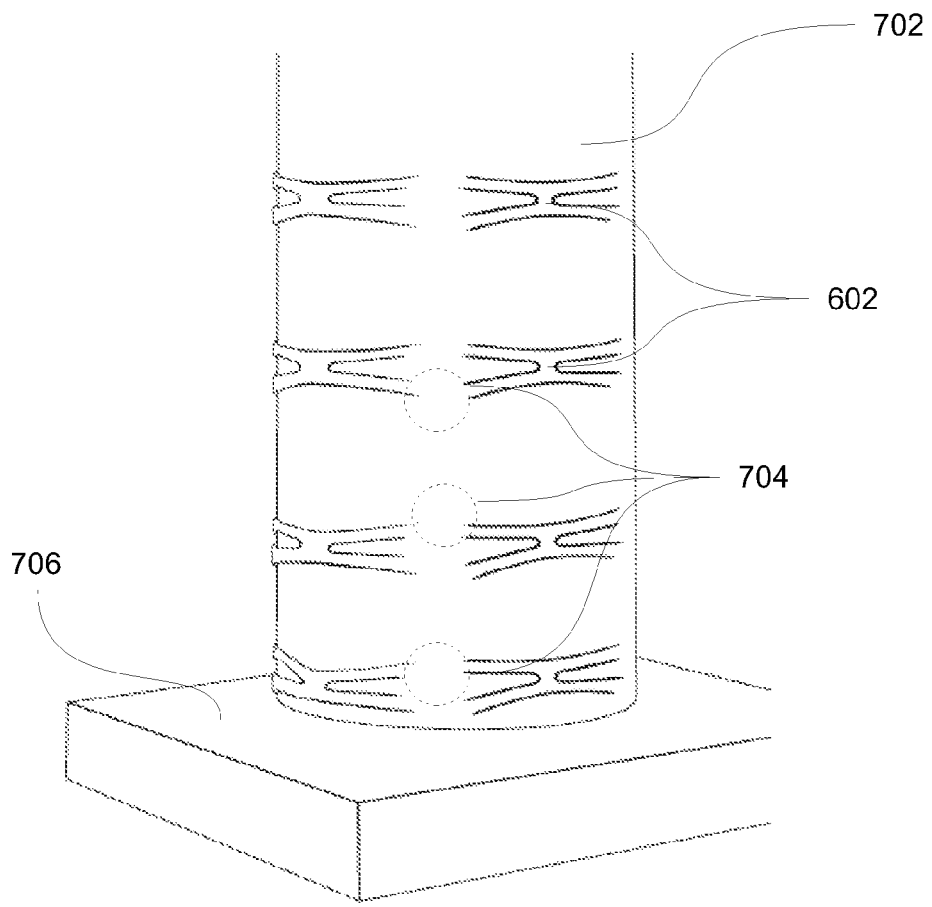
FIG. 7 is a diagram illustrating alternative embodiments of representing a cloth rendering matrix on a cylinder.

Referring now to FIG. 7, a diagram illustrating alternative embodiments of representing a cloth rendering matrix on a cylinder 700 is shown. In this embodiment, portions of the matrix conform to the body of the cylinder 702. This is an embodiment where the cloth is stretched around the cylinder 702 such that it does not exhibit a complete ball and stick matrix. In particular, the cloth is compressed against a flat surface 706 while being applied to a cylinder. This creates a series of peaks 602, however, not all the peaks that would normally be associated with a looser fitting cloth matrix are exhibited. In this embodiment, one or more nodes or balls may be replaced with surface conforming to the cylinder 704, or flat. These flats 704 may be rendered using the contours of the underlying surface, with sticks that would normally connect the missing balls tapering into the flat 704.

Figure 8A:
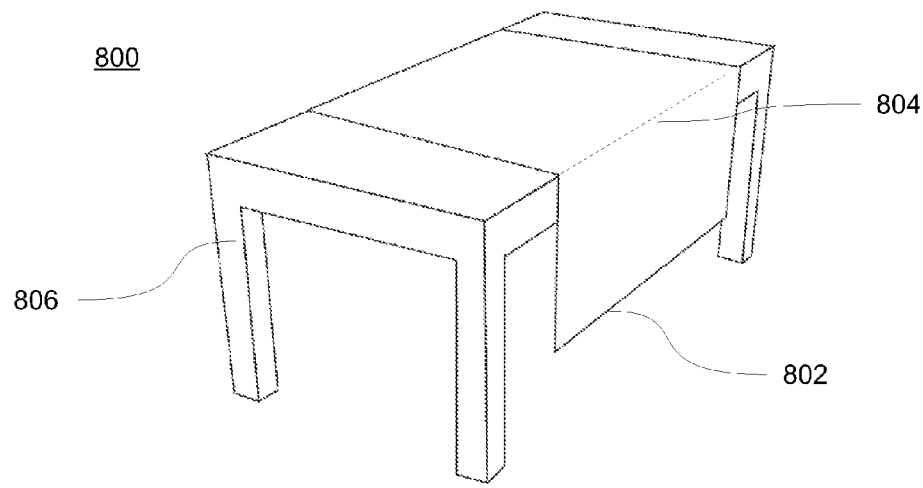
FIGS. 8a and 8b are diagrams illustrating partially supported cloth draping.

FIG. 8a illustrates partially supported cloth draping 800. In this Fig., cloth is draped over a table 806, with the hanging cloth being pulled downwards by gravity. Notably, a crease, or bend 804 is created where the table 806 top stops. This edge is referred to as a line of suspension 804, since it denotes where cloth draping 802 begins.

Figure 8B:
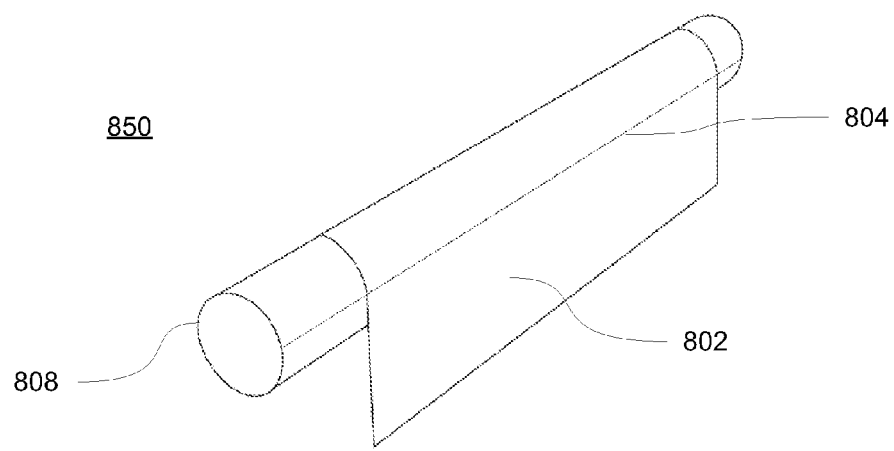

Similarly, FIG. 8b diagrams illustrating partially supported cloth draping on a cylinder. The cloth draping 802 has its line of suspension 804 where the cloth 802 separates from the side of the cylinder 808 due to the cylinder's 808 curvature.

Figure 9:
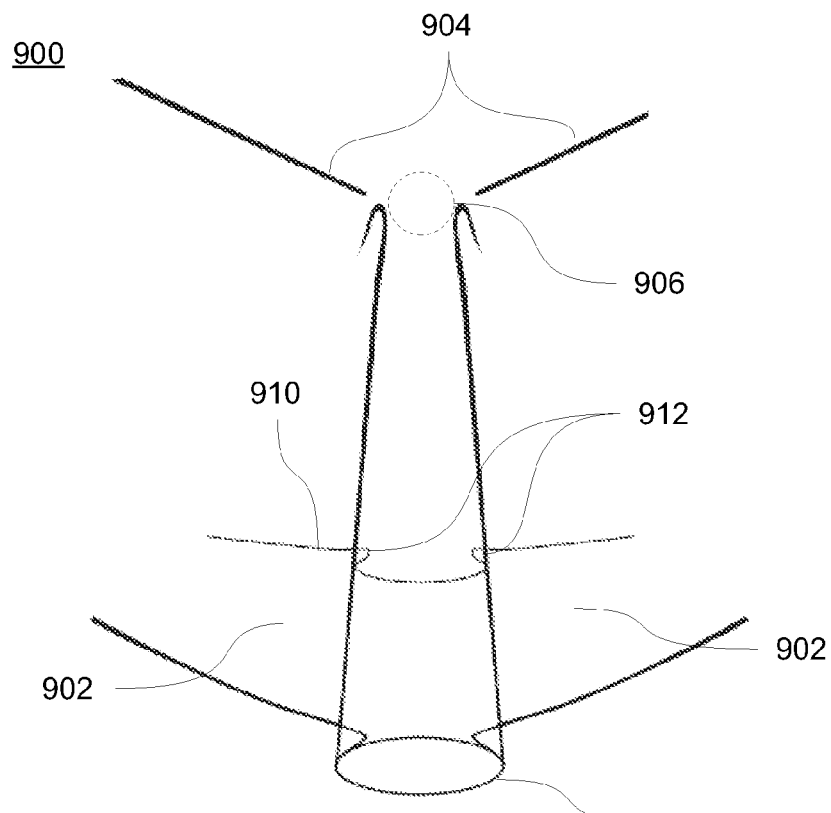
FIG. 9 is a diagram illustrating rendering of cloth draped over a corner.

Referring now to FIG. 9, modeling and rendering of cloth draped over a corner surface 900 is depicted. The hanging portion of the cloth 900 is supported by suspension points 904 on both sides of the corner 906 to create hanging panels 902. In this embodiment, the wave section 908 of the cloth 900 can be modeled by cones in a fashion similar to that of a planar wave 100. A single, partial main cone 908 makes up the primary wave, and a partial cone 912 on each side of the main cone faces outwards and integrates the main cone 908 into the two side panels 902 as shown by the contour line 910.

Figure 10:
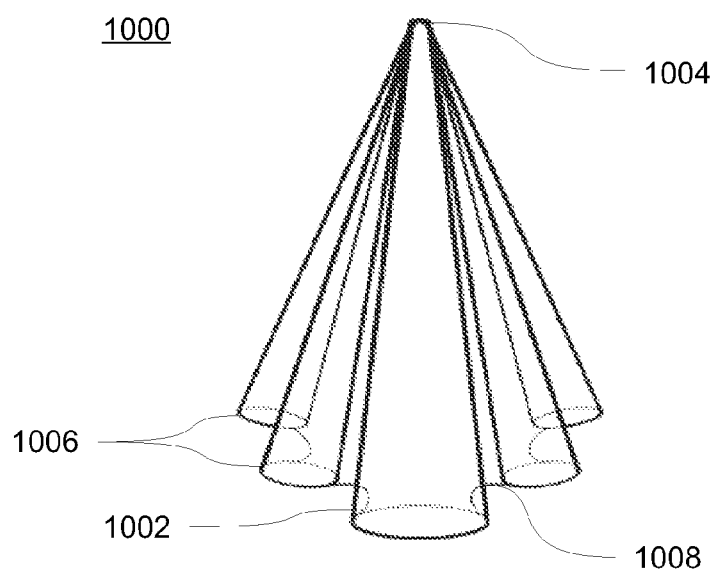
FIG. 10 is a diagram illustrating rendering of hanging cloth.

FIG. 10 depicts an embodiment of rendering of hanging cloth 1000. In FIG. 10, the hanging cloth 1000 is draped over a hook 1004, and has only one point of suspension. The main cone 1002 and secondary cones 1006 alternate with outward cones 1008. In an embodiment as shown in FIG. 10, the main cone 1002 may be mostly closed, with, for example, a 90 degree section removed from the inward facing side, and with the forward facing cones 1008 joined such that the primary cone 1002 protrudes in front of the forward cones 1008 and any secondary cones 1006. The secondary cones 1006 may then be joined to the forward facing cones 1008, but placed behind and slightly outside the centerline of the main cone 1002 to give the hanging cloth rendering the volume of realistic hanging cloth.

The cones used to form any of the handling cloth embodiments may be varied based on the physical properties, just as the cylinders discussed above, with respect to FIG. 5a. Furthermore, multiple cones may be joined to each other, or to a flat surface, with the joints optionally smoothed to generate a smooth cloth surface model for rendering. In particularly useful embodiments, the cones may be oblique cones where the axis of the cone is non-perpendicular to the base to reflect the fact that folded hanging cloth tens to flare outwards, and not hand straight down. Additionally the cone may be a circular cone, or may be any cone using any other useful shape as a base, such as, but not limited to, an ellipse. In other useful embodiments, a plane may be passed through the cone to leave a partial or truncated cone with any conic section desired. For example, the cone may be truncated by a plane passing through the base on one side of the axis, and through the side of the cone on the opposite side of the axis, leaving a conic section with a parabolic edge.

Figure 11:
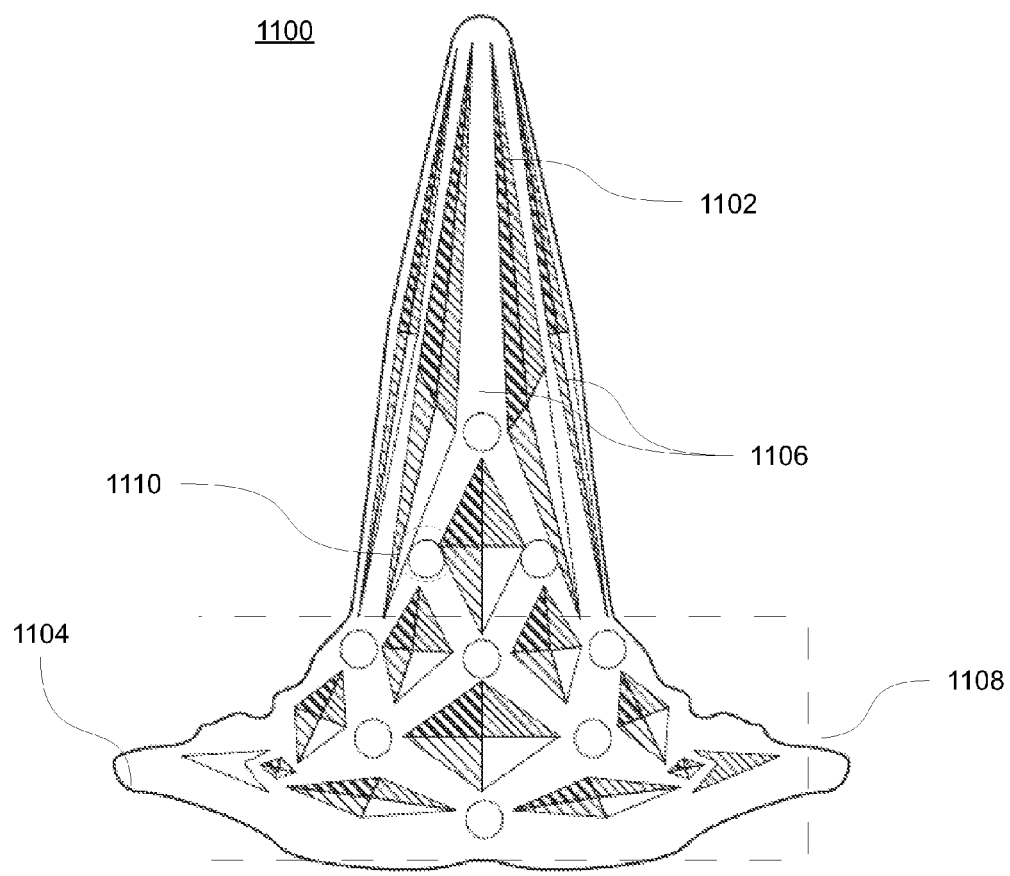
FIG. 11 is a diagram illustrating rendering of cloth draped onto a flat surface.

Referring now to FIG. 11, rendering 1100 of cloth 1102 draped onto a flat surface 1104 is depicted. One or more cones 1106, as described above for FIGS. 9 and 10, may be combined with a cloth rendering matrix as described above for FIGS. 5a through 7. In this embodiment, cones 1106 in the upper, hanging section of the cloth 1102 may be blended into a wave interference matrix 1108. In particularly useful embodiments, the ends of cones 1106 may terminate at the joints, or balls 1110, in the interference matrix 1108. In such an embodiment, the join of the cone 1106 to the ball 1110 may advantageously use the same principles for rendering and smoothing as discussed above with respect to FIGS. 5a through 7. Using the aforementioned principles, the ends of the cones 1106 would be treated as a cylinder for rendering and smoothing purposes.

Alternatively, the entire cloth 1102 model may be generated as a ball and stick model, with the upper, conic sections 1106 modeled as part of a ball and stick matrix, with appropriate variations applied to their structure.

Figure 12:
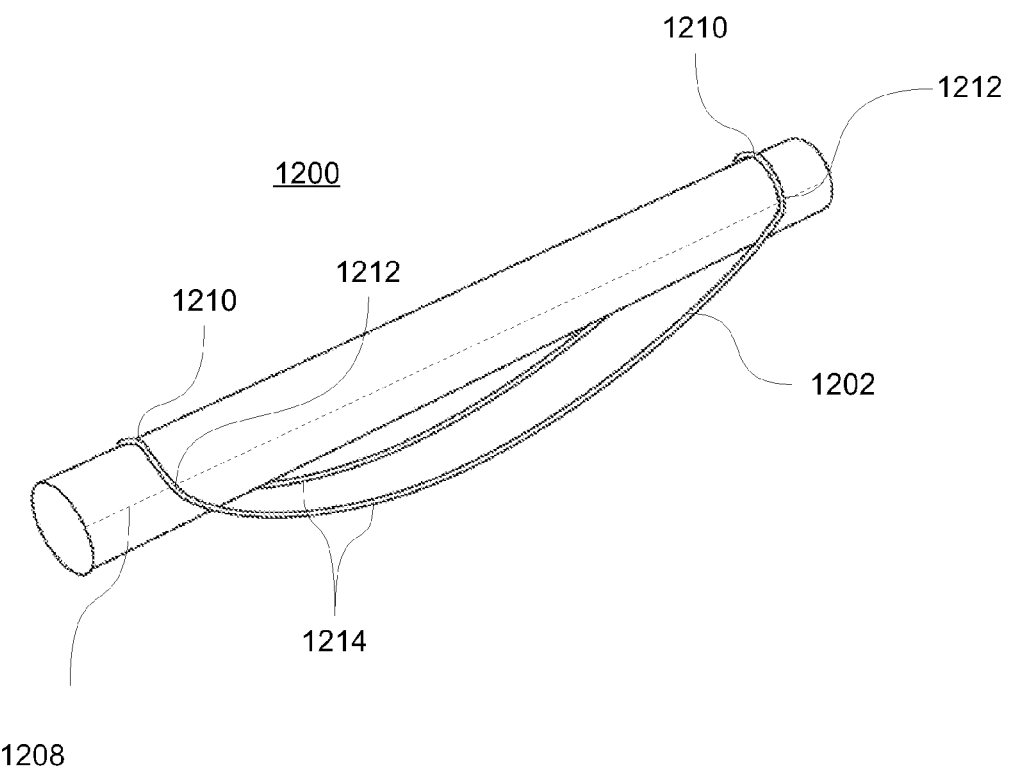
FIG. 12 is a diagram describing a rope draped on a cylinder.

Referring now to FIG. 12, a rope draped on a cylinder 1200 is depicted. A closed loop of rope 1202 draped on a cylinder 1208 will have its highest points 1210 at the apex of the cylinder 1208. The rope 1202 will lie against the cylinder 1208 until the rope reaches the suspension line 1212 of the cylinder 1208. From the suspension line 1212 of the cylinder 1208, it hangs free, forming a catenary curve between suspension points 1212. Additionally, the low point of the curve 1214 will vary depending on the incline of the cylinder 1208.

Figure 13A:
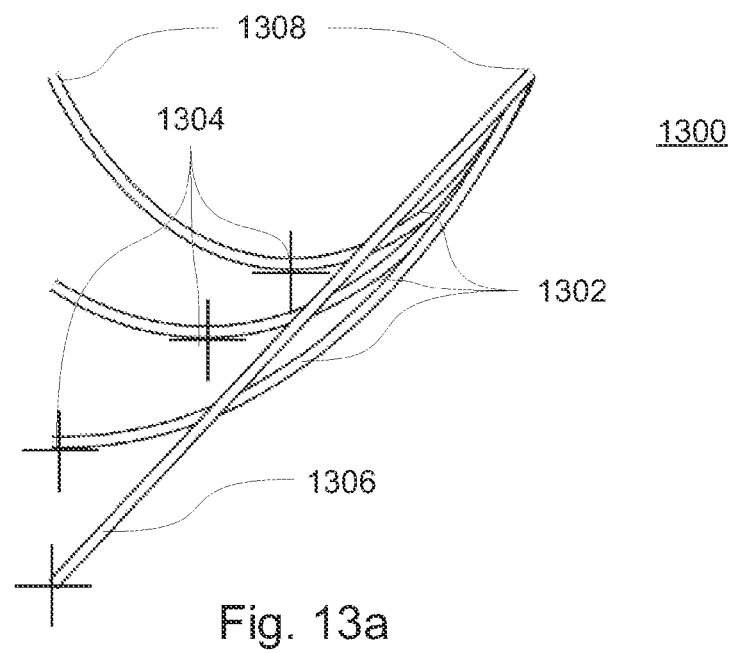
FIGS. 13a and 13b are diagrams illustrating embodiments of rendering ropes supported at multiple points.
Figure 13B:
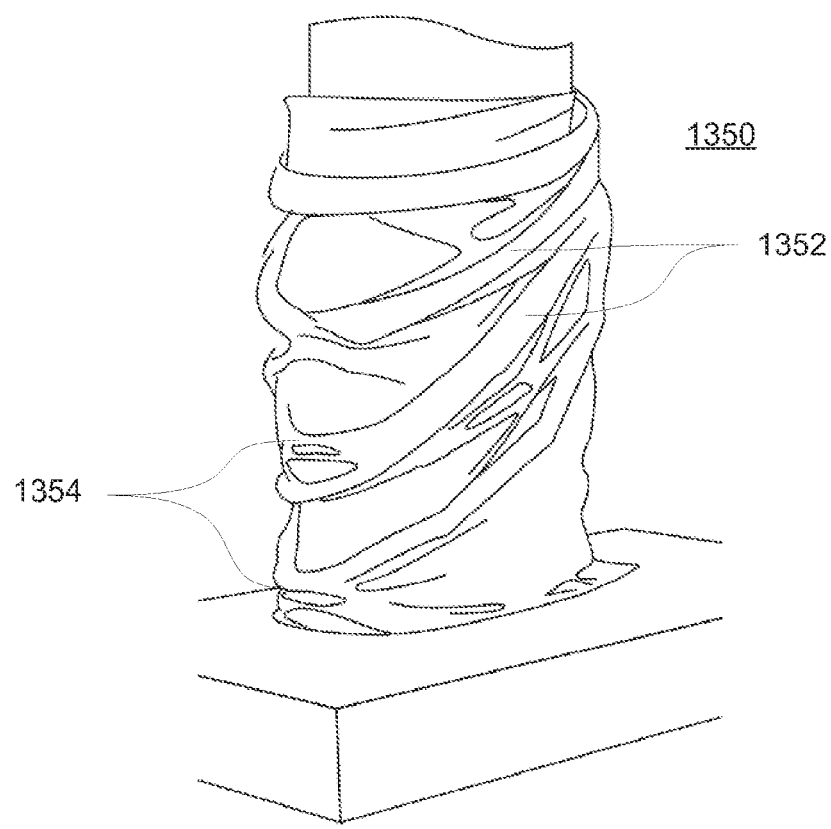

FIGS. 13a and 13b are diagrams illustrating embodiments of rendering ropes supported at multiple points 1300. Referring to FIG. 13a, a set of ropes 1302 is shown hanging from two points of suspension 1308. Depending on the length of the rope 1302 and 1306 in comparison to the distance between the points of suspension 1308, the rope 1302 and 1306 may hang in a catenary curve 1302, or may be a straight line 1306 when pulled tight. Additionally, when one point of suspension is above another, the apex, or lowest point of a hanging rope 1304 moves from the center of the rope 1302 towards the lower point of suspension 1303.

FIG. 13b illustrates an embodiment of rendering hanging cloth using ropes to model the peaks of a wave interference matrix as described for FIGS. 5a through 7. Here, the primary loops 1352 are supported by a nail (not shown) on the back side of the post, causing the main loops to be supported at two points of suspension. The second point of suspension is the side of the post opposite the nail. Secondary loops 1354 form due to the compression of the front cloth section. While this system may be modeled using a ball and stick method, it should be noted that the sticks in this model need not be straight, and can be formed from section of the catenary curved ropes forming the main and secondary loops.

Figures 14A, 14B:
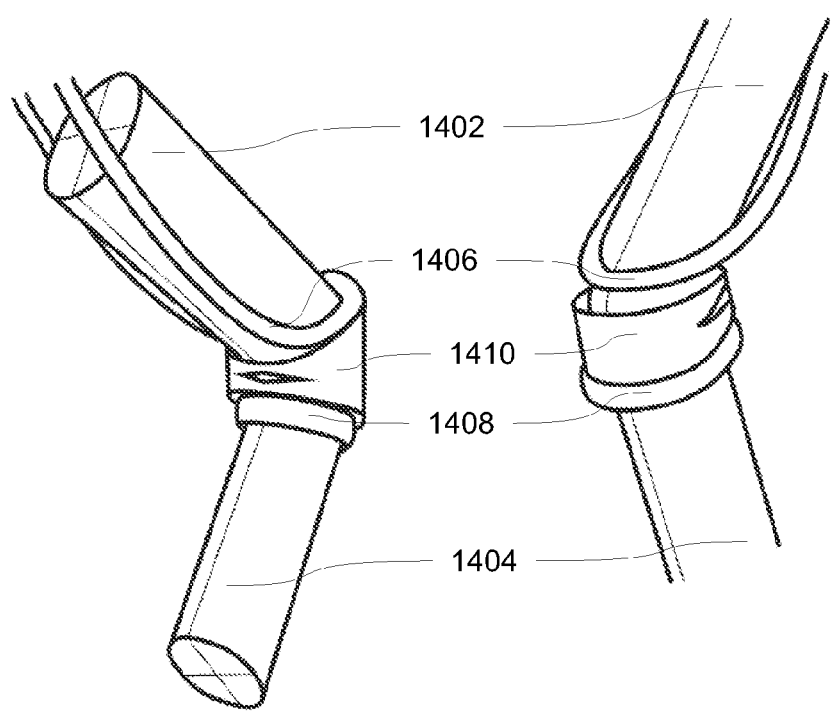
FIGS. 14a and 14b are diagrams illustrating embodiments of a cloth rendering matrix for cloth draped on a jointed cylinder.

FIGS. 14a and 14b are diagrams illustrating embodiments of a cloth rendering matrix for cloth draped on a jointed cylinder. FIG. 14a is a rear view 1400 of a jointed cylinder, while FIG. 14b is a front view 1450 of the same joined cylinder. In this embodiment, the draping of looped cloth may be used to, but is not limited to, model cloth on a joint for a human figure, such as at an elbow, knee, ankle, torso bent at the waist or a finger. Here, a draped upper loop 1406 simulates a fold in cloth on the upper joint section 1402. This upper loop 1406 may be advantageously combined with one or more secondary loops 1410 and 1408 at the joint between upper 1402 and lower 1404 joint sections. Additionally, some embodiments may have one or more of the secondary loops modeled as partial loops 1410, with a section of the loop flattened to conform to the tension created by the flexed joint 1400.

Figure 15A:
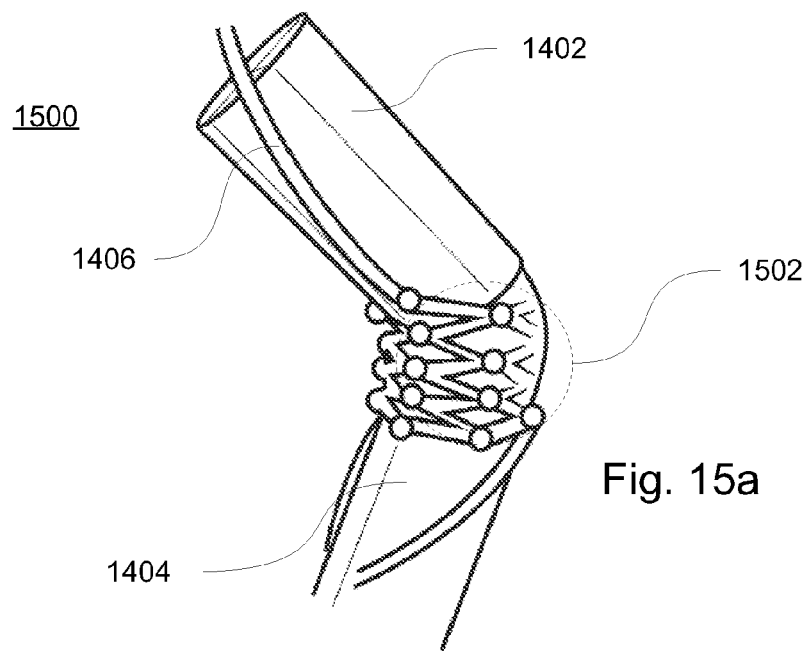
FIGS. 15a-15c are diagrams illustrating embodiments of a cloth rendering matrix for cloth draped on a jointed cylinder.
Figures 15B, 15C:
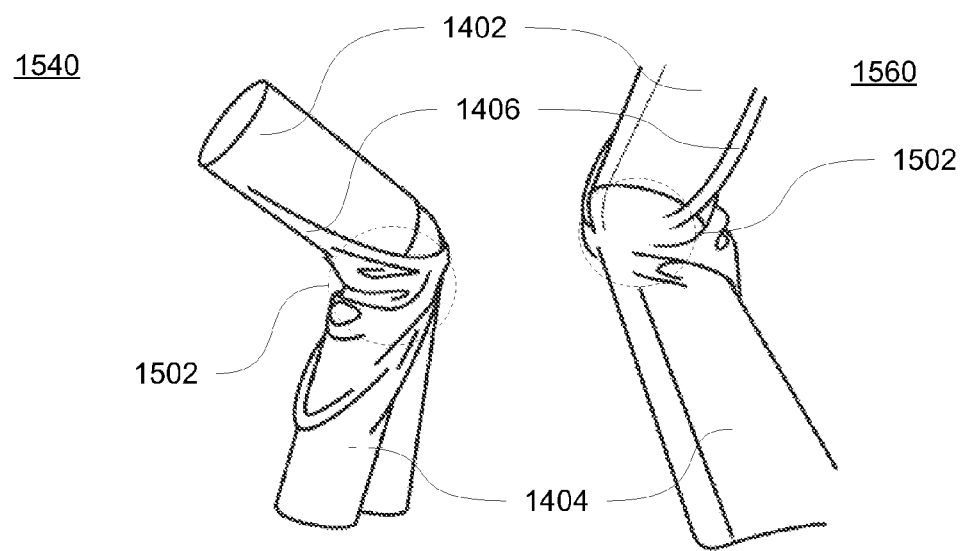

FIGS. 15a-15c illustrate embodiments of a cloth render on a jointed cylinder. FIG. 15a illustrates the use of a ball and stick mesh 1502 applied to a joint 1500, while FIG. 15b illustrates the right side of a rendered cloth draped flexed joint 1540 and FIG. 15c the left side 1560.

A ball and stick mesh using curved sections 1502 may be applied to the joint between the upper 1402 and lower 1404 sections of a flexed joint. In one useful embodiment, a draped loop 1406 may be integrated into the cloth surface. The draped loop 1406 may be integrated into the ball and stick mesh 1502 using the techniques described above with respect to FIG. 11, where the draped loop acts as a stick in the stick and ball mesh 1502 and joins with a ball in the ball and stick mesh 1502.

Figure 16:
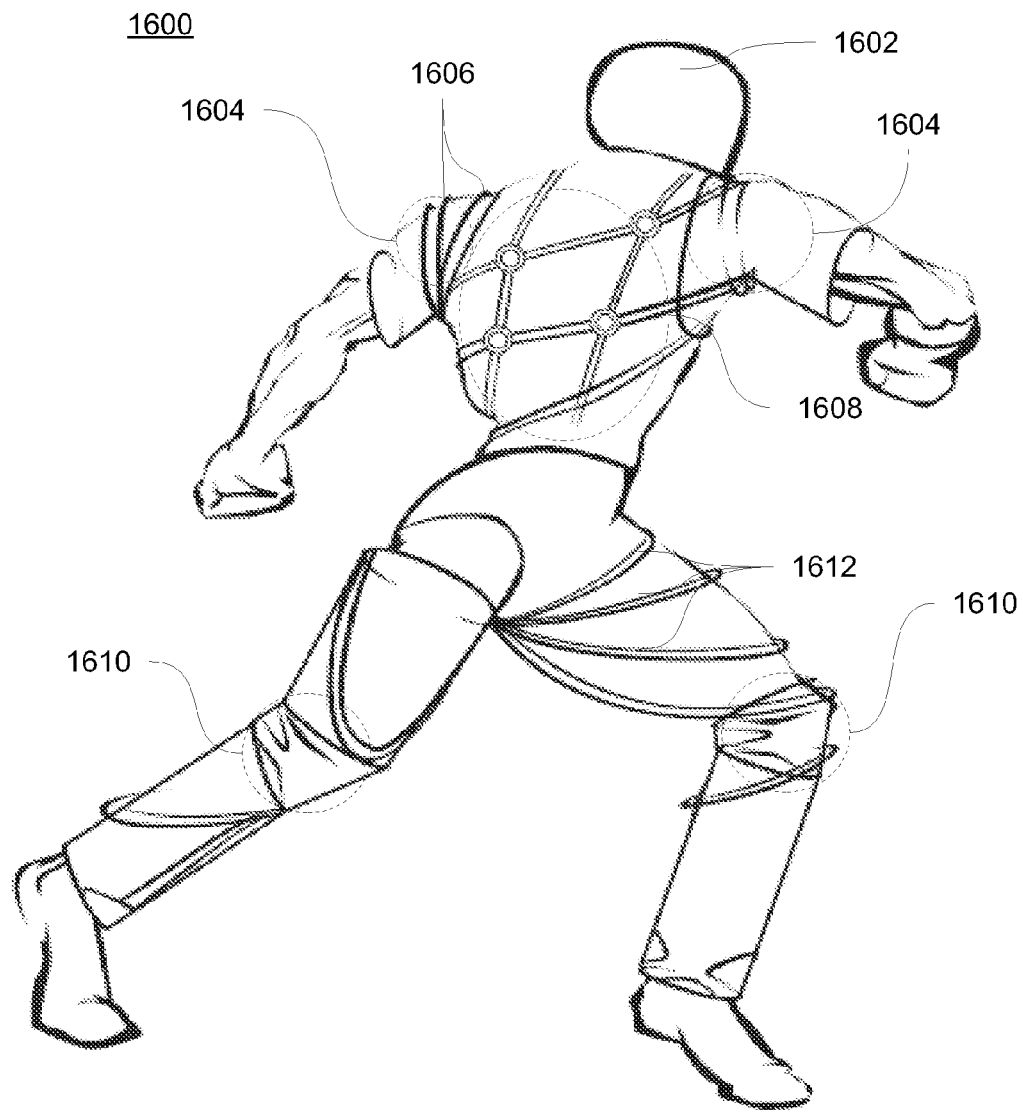
FIG. 16 is a diagram illustrating embodiments of cloth rendering matrices applied to cloth draped on the human form.

FIG. 16 illustrates and embodiments of cloth rendering matrices on the human form 1600. On this human form 1602, an interference matrix 1608 is applied to the form's 1602 back to illustrate the twist and stretch of the form's 1602 torso, and the resulting stretch applied to the cloth from the left hip to the right shoulder and from the back, under the right arm to the front of the torso. This resulting stretching of the torso results in an interference matrix 1608 with wave ridges generally parallel to the direction of the stretch, that is up the back and around the right shoulder.

This rendering 1600 also illustrates the use of draped loops at the shoulders 1604 and knees 1610. The shoulders 1604 have multiple loops 1606 encircling the shoulders 1604 to represent the bunching of cloth at the shoulders 1604. The knees 1610 have a combination of draped loops matrices on the thighs, and connected to loops encircling the knees to illustrate the bunching and stretching of pants across the form's 1602 thighs and knees 1610. Similarly, partial drapes loops 1612 are used on the upper thigh.

Figure 17:
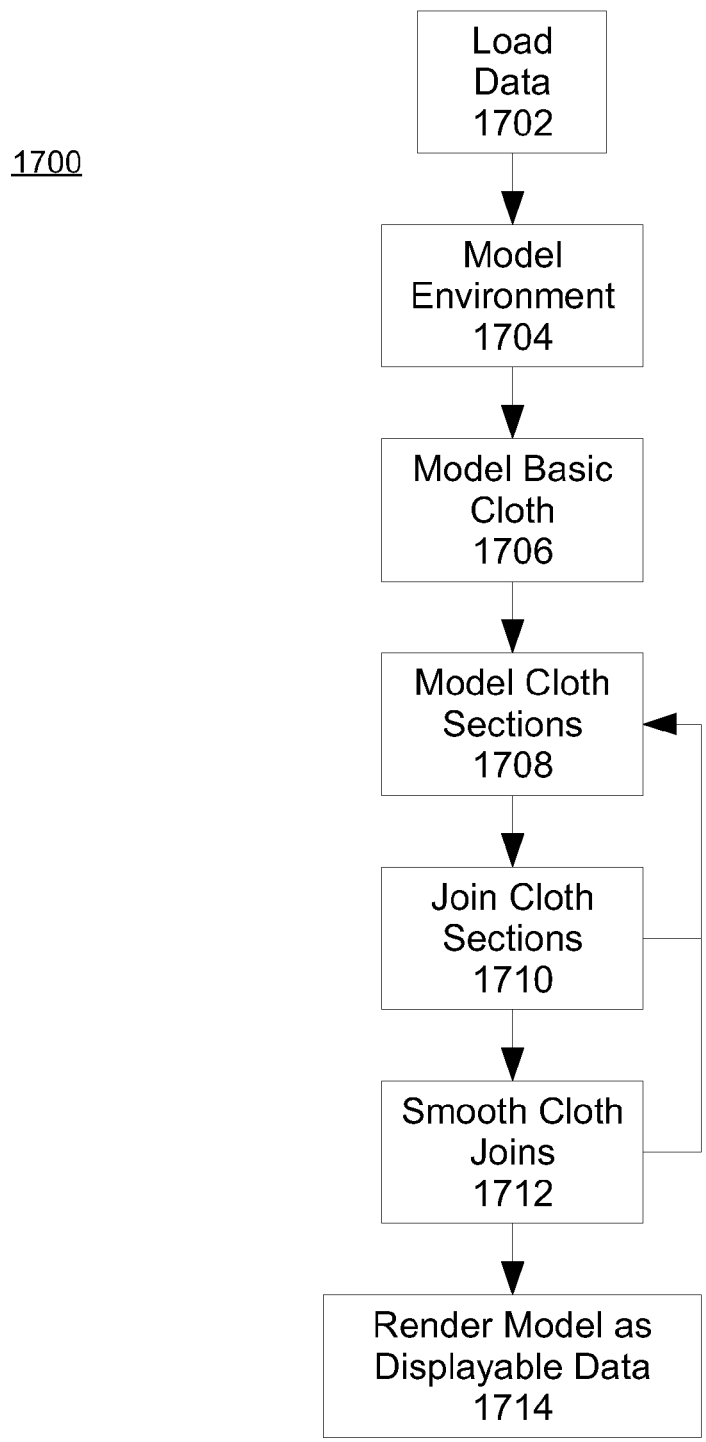
FIG. 17 is a flowchart illustrating one embodiment of a method for modeling and rendering draped cloth.

FIG. 17 is a flowchart illustrating one embodiment of a method 1700 for modeling and rendering draped cloth. While the steps illustrated herein are described as one embodiment of the presented principles, skilled practitioners of the arts will recognize that the steps can be performed in any practical order, and are not limited to being executed in the order described in this particular embodiment. Furthermore, while the steps herein are described in terms of being executed in this embodiment by software, the each step may also be executed by hardware, or a combination of software and hardware.

Initially, in step 1702, the system loads data related to the target cloth to be rendered. This data may include data related to the environment, the physical characteristics of the cloth, data related to any animations, or any other data useful in rendering the target cloth. In one useful embodiment, the data may be loaded from a file, or transferred in from another computer program. Alternatively the data may be fetched from a database, or may be generated at runtime and used by the system.

In step 1704, the physical characteristics of any environment models may be modeled. In one useful embodiment, any physical elements of a scene that affect the shape of modeling of the target cloth may be generated. For example, where clothing is to be rendered on a video game character, the positioning, stature, body shape or the like may be calculated. In step 1706, a basic cloth model may optionally be generated. In particularly useful embodiments, the basic cloth model may determine the base positioning and/or sizing of the cloth. This basic model may advantageously be contoured, or shaped, based on the environment model generated in step 1704, or may be generated from, or based on, the data loaded in step 1702.

In step 1708, cloth sections are modeled. In one useful embodiment, the sections of cloth may be individually modeled based on any combination of loaded data, environment models, basic cloth models, calculated data, user input or any other data. The cloth sections may be, for example, but are not limited to, cylinders, spheres, cones, and flat sections for rendering a wave interference matrix as described above with respect to FIGS. 4 through 6. In another useful embodiment, a cloth section may be a NURBS surface, and the control points defining the modeled cloth section surface set based on the basic cloth model or generated based on any other data.

In one useful embodiment, the cloth sections may be automatically generated based on physical properties of the cloth. For example, the physical properties of a denim pant leg around a model's bent knee may call for two full suspended loops at the knee, with height, spacing and minimum radius for those loops determined by the denim's stiffness. The angle of the bent knee may require two full loops, while bending the same knee past a threshold may introduce a third, partial loop, and bending the same knee past a second threshold may change the third partial loop into a full loop.

In step 1710, the system running the method 1700 may join the modeled cloth sections. The sections may be joined into any number of final pieces, depending on the desired modeling of the resulting pieces. For instance a model for a coat over a model of a shirt may be joined such that the coat is separate from the shirt. This embodiment may be particularly useful in animated scenes, where a cloth model is generated for a first frame, and the cloth model is retained or adjusted for a second scene, avoiding the processing of new basic cloth models and new cloth sections. In such an embodiment, the loaded data may include keyframe data related to only certain frames, and the system may interpolate the position and modeling of the cloth for intervening frames. Alternatively, the loaded data may have keyframe data and data related to the change of the cloth model from one format to the next.

In particularly useful embodiments, the cloth sections may be joined as described above with respect to FIGS. 1a-4. Alternatively, the joining may simply roughly align the edges.

Smoothing the joins in step 1712 may be performed on the joined cloth sections. The smoothing may be accomplished as described above for FIGS. 5a-7.

Error correction may also be performed in the smoothing step 1712, or in the joining step 1710. In particularly useful embodiments, the dimensions of the modeled cloth may be calculated to verify that the dimensions of the modeled cloth do not deviate from a predetermined value. This predetermined value may be loaded or calculated data, and may include values for measurement of the cloth model in one or more dimensions. For example, when rendering a flag suspended at one point, the length of each edge of the flag may be loaded in step 1702. If the dimensional calculation reveals that the modeling was not accurate enough, and the calculated lengths of the flag's edges vary by more than a predetermined amount, steps 1708, 1710 and 1712 may be performed again, with data reflecting the feedback from the error correction calculation.

The dimensional calculation may be the sum of the cloth section surface lengths after joining, with the sum taken along a path in any direction along the surface of the cloth. Alternatively, the dimensional calculation may be a contour integral. However, any error checking desired may be advantageously employed without deviating from the spirit of the present principles.

The cloth model may next be rendered as displayable data in step 1714. In particularly useful embodiments, the data generated in previous steps may be transformed into a standard format usable by standard display apparatuses. For example, in a video game, mesh modeling is frequently used, as the most common game graphics rendering engines handle mesh modeling quickly, albeit with some los of detail. In step 1714, a cloth model calculated as a NURBS contour maybe converted into a mesh model suitable for display through a rendering engine. Alternatively, in an embodiment where the cloth is being rendered for a video presentation, the cloth model may be generated for each frame, and rendered as a single frame of video prior to being saved and assembled into a video presentation with the remaining frames.

Figure 18:
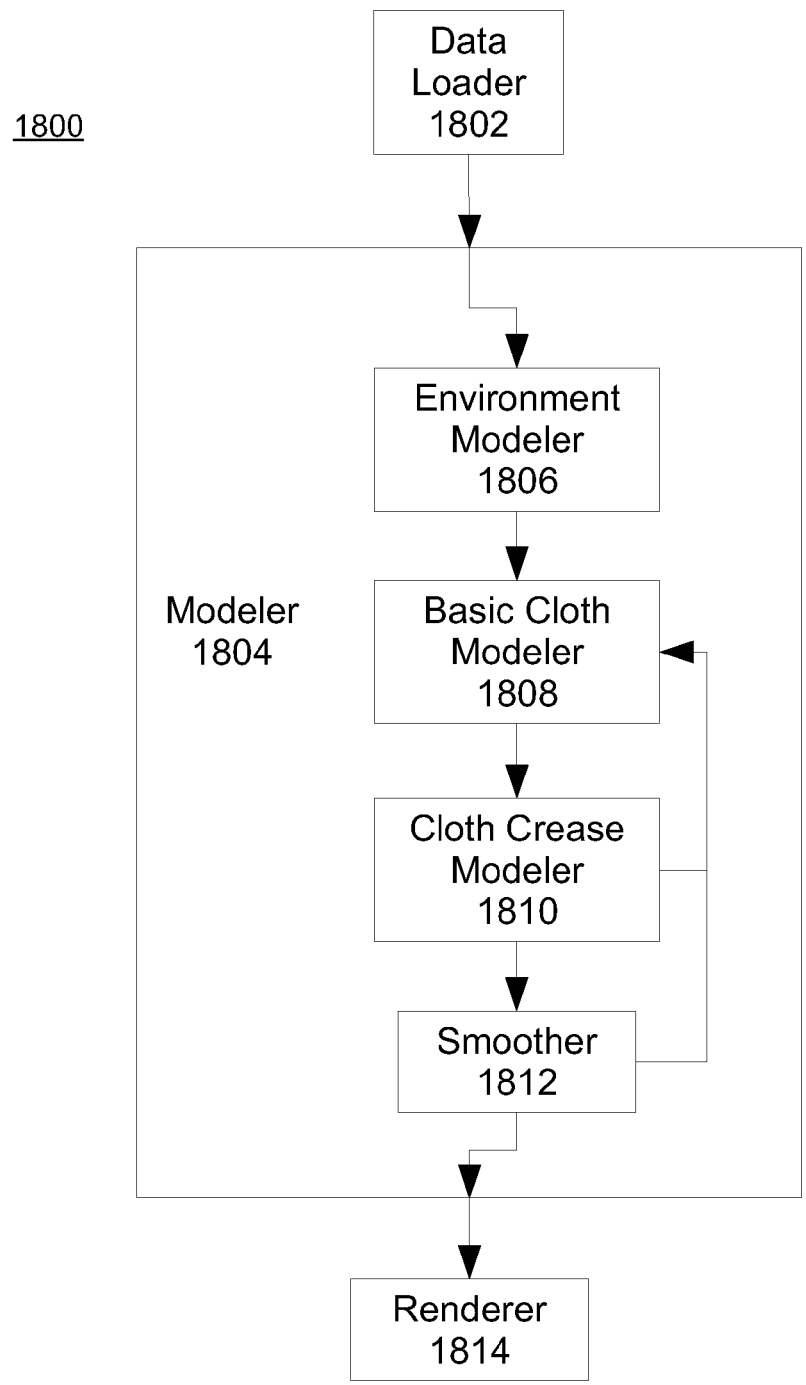
FIG. 18 is a diagram illustrating one embodiment of a system for modeling and rendering draped cloth.

FIG. 18 is a diagram illustrating one embodiment of a system 1800 for modeling and rendering draped cloth. The system 1800 may be comprised of a data loader module 1802, a modeler module 1804 and a renderer module 1814. The data loader module 1802 may be configured to load or receive data relating to the target cloth model to be generated, or perform any other portion of the data loading step 1702, described above. The modeler module 1804 is a master module that may advantageously include one or more modules for handling the modeling of the target draped cloth. The modeler module 1804 may be comprised of an environment modeler module 1806, basic cloth modeler module 1808, a cloth crease modeler module 1810 and a smoother module 1812. The environment modeler may generate the model or scene onto which the target draped cloth will be applied. In one useful embodiment, the environment modeler module 1806 may be configured to perform the environment modeling step 1704 of FIG. 17, as described above. The basic cloth modeler module 1808 may generate a base cloth model to conform to the environment model generated by the environment modeler module 1806 as described above with respect to step 1704. The basic cloth modeler module 1808 may save or transmit the base cloth model to another module for refinement and modification according to the present principles.

The cloth crease modeler module 1810 is configured to generate a cloth model according to steps 1708 and 1710, described above. The cloth crease modeler module 1810 may apply the properties of the target cloth to the basic cloth model, to determine the number and nature of cloth sections to generate, and where the cloth sections should be located. This may be accomplished by modifying the basic cloth model, or by generating new cloth sections and joining them together to form a new cloth model. In one useful embodiment, the cloth crease modeler module 1810 may generate cloth sections and optimize those sections so that when the sections are joined, the edges of joined cloth sections align without the need for smoothing.

The cloth crease modeler module 1810 may also perform error correction on the joined cloth model, and correct the model itself, or remodel the cloth via the basic cloth modeler module 1808. The advantage of using error correction in the cloth modeler is that performing the processor intensive step of smoothing may be avoided. The disadvantage to that particular methodology is that smoothing may introduce errors that go uncorrected.

The smoother module 1812 is configured to executed the smoothing step 1712 described above with respect to FIG. 17. The smoother module 1812 is optional, as skilled practitioners will recognize that certain modeling formats, such as single NURBS surfaces or scalable vector graphics are smooth surface contours and will not generally require smoothing. Furthermore, the smoother module 1812 may optionally perform error correction as described above, with error correction at the smoother providing superior modeling accuracy at the cost of additional processing due to multiple passes through the smoother module 1812 being required.

Once the target cloth model has been generated by the modeler module 1804, it may be rendered in the renderer module 1814. The renderer module 1814 may be configured to perform the rendering method step 1714 described above with respect to FIG. 17 and transform the target cloth model into a displayable format.

While each of the above described modules is described in terms of being separate module, one or more of any of the modules described above may be combined or eliminated to generate the desired cloth model.

It will be appreciated that although the above described system and method for generating computer rendered cloth is described as used on a computer, the present principles are not limited to such use. For instance, the principles could be used in any other electronic or digital implementation, including smartphones, game consoles, graphics rendering stations, graphic design software, graphics rendering APIs, game engines, physical modeling software, or any other hardware device or software application that generates a graphic image or model. While the foregoing embodiments of the principles have been set forth in considerable detail for the purposes of making a complete disclosure of the principles, it will be apparent to those of skill in the art that numerous changes may be made to such features without departing from the spirit and the scope of the present principles.

I claim:

1. A method for generating a computer rendered cloth, wherein the method is executed on a computer configured to display graphic data, comprising the method steps of:

storing a cloth rendering matrix comprising nodes and anti-nodes interconnected such that they represent a repeated pattern of interconnected projecting and receding regions, wherein each receding region comprising four triangular polygons interconnected at a peak of the receding region to form the anti-node of the receding region, wherein each projecting region comprising eight triangular polygons interconnected at a peak of the projecting region to form the node of the projecting region, wherein said four triangular polygons of said receding region are shared with the projecting regions to form said eight triangular polygons of said projecting regions;

loading cloth modeling data including at least one physical cloth modeling property; and creating a target cloth model via at least one processor by applying the at least one physical cloth modeling property to the cloth rendering matrix, wherein said target cloth model comprises folds formed by said interconnected nodes and anti-nodes.

2. The method of claim 1, further comprising the method step of error checking the target cloth model based on at least a portion of the loaded cloth modeling data to determine if errors in target cloth model exceed a predetermined threshold.

3. The method of claim 1, wherein the method of creating the target cloth model further comprises rendering the cloth rendering matrix with a plurality of model cloth sections and joining the plurality of cloth model sections.

4. The method of claim 3, wherein the method of joining the plurality of cloth model sections comprises aligning and smoothing the edges of the plurality of model cloth sections and generating a smoothed target cloth model.

5. The method of claim 3, wherein the cloth model sections are at least one section selected from a group consisting of a partial cylinder, a partial sphere, a partial cone, a partial loop, a partial catenary curve, a flat plane, a non-uniform rational basis spline surface, and any combinations thereof.

6. The method of claim 1, wherein the cloth rendering matrix is stored as a ball and stick model.

7. The method of claim 1, wherein the cloth rendering matrix is stored as a matrix of coordinates and vectors.

8. The method of claim 1, wherein the at least one physical cloth modeling property is a physical property related to at least one selected from the group consisting of a cloth, an environment, an object on which the target cloth model will be applied, and any combination thereof.

9. The method of claim 8, wherein the physical property related to the cloth is selected from the group consisting of cloth density, cloth thickness, cloth stiffness, cloth stretchiness, cloth adherence to objects, and any combinations thereof.

10. The method of claim 8, wherein the physical property related to the environment is selected from the group consisting of environmental force, environmental gravity, environmental compression, environmental tension, point of suspension, line of suspension, atmospheric density, and any combinations thereof.

11. The method of claim 1, further comprising the step of creating a basic cloth model based on an environmental model on which the target cloth model will be applied.

12. The method of claim 11, wherein the basic cloth model comprises at least one cone to render cloth hanging from at least one point of suspension.

13. The method of claim 11, wherein the basic cloth model comprises a catenary curve to render cloth draping between at least two points of suspension.

14. The method of claim 1, further comprising the step of rendering the target cloth model into a displayable format.

15. The method of claim 1, wherein each of the four triangular polygons are further subdivided into two or more triangular polygons.

16. A system for generating an image on a computer system, comprising:

a data loader module configured to load cloth modeling data including at least one physical cloth modeling property;

modeler module in signal communication with the data loader module configured to generate a target cloth model by applying the at least one physical cloth modeling property to a cloth rendering matrix, wherein said cloth rendering matrix comprising nodes and anti-nodes interconnected such that they represent a repeated pattern of interconnected projecting and receding regions, wherein each receding region comprising four triangular polygons interconnected at a peak of the receding region to form the anti-node of the receding region, wherein each projecting region comprising eight triangular polygons interconnected at a peak of the projecting region to form the node of the projecting region, wherein said four triangular polygons of said receding region are shared with the projecting regions to form said eight triangular polygons of said projecting regions; and a renderer module configured to render the target cloth model into a displayable format, wherein said target cloth model comprises folds formed by said interconnected nodes and anti-nodes.

* * * * *